(12) United States Patent
Miyata et al.

(10) Patent No.: US 6,531,866 B2
(45) Date of Patent: Mar. 11, 2003

(54) INDUCED CURRENT POSITION SENSOR HAVING A CLOSED MAGNETIC PATH

(75) Inventors: Toshiharu Miyata, Kawasaki (JP); Masayoshi Okamoto, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/892,441

(22) Filed: Jun. 28, 2001

(65) Prior Publication Data

US 2002/0008510 A1 Jan. 24, 2002

(30) Foreign Application Priority Data

Jun. 30, 2000 (JP) ........................................ 2000-198895

(51) Int. Cl.[7] ................................................. G01B 7/14
(52) U.S. Cl. ............................ 324/207.12; 324/207.17; 324/207.24; 33/708
(58) Field of Search ........................ 324/207.17, 207.12, 324/207.24; 33/708, 810; 336/84 M

(56) References Cited

U.S. PATENT DOCUMENTS 5,351,004 A * 9/1994 Daniels et al. ......... 324/207.12
5,901,458 A 5/1999 Andermo et al.

* cited by examiner

Primary Examiner—Walter E. Snow
(74) Attorney, Agent, or Firm—Oliff & Berridge, PLC

(57) ABSTRACT

There is provided an induced current position transducer having an improved signal intensity and durability to gap variations. This can be achieved by preventing harmful diffusion of magnetic fluxes to reduce a loss due to leakage fluxes and forming an efficient closed magnetic path between a magnetic field generator and a magnetic flux sensor. A high permeable substance is disposed in a target magnetic path on members of a read head and a scale. This arrangement can suppress a loss due to leakage fluxes caused from diffusion of magnetic fluxes occurred in the conventional winding structure, improving a signal intensity of a magnetic flux and reducing an affection from an external magnetic flux.

7 Claims, 8 Drawing Sheets

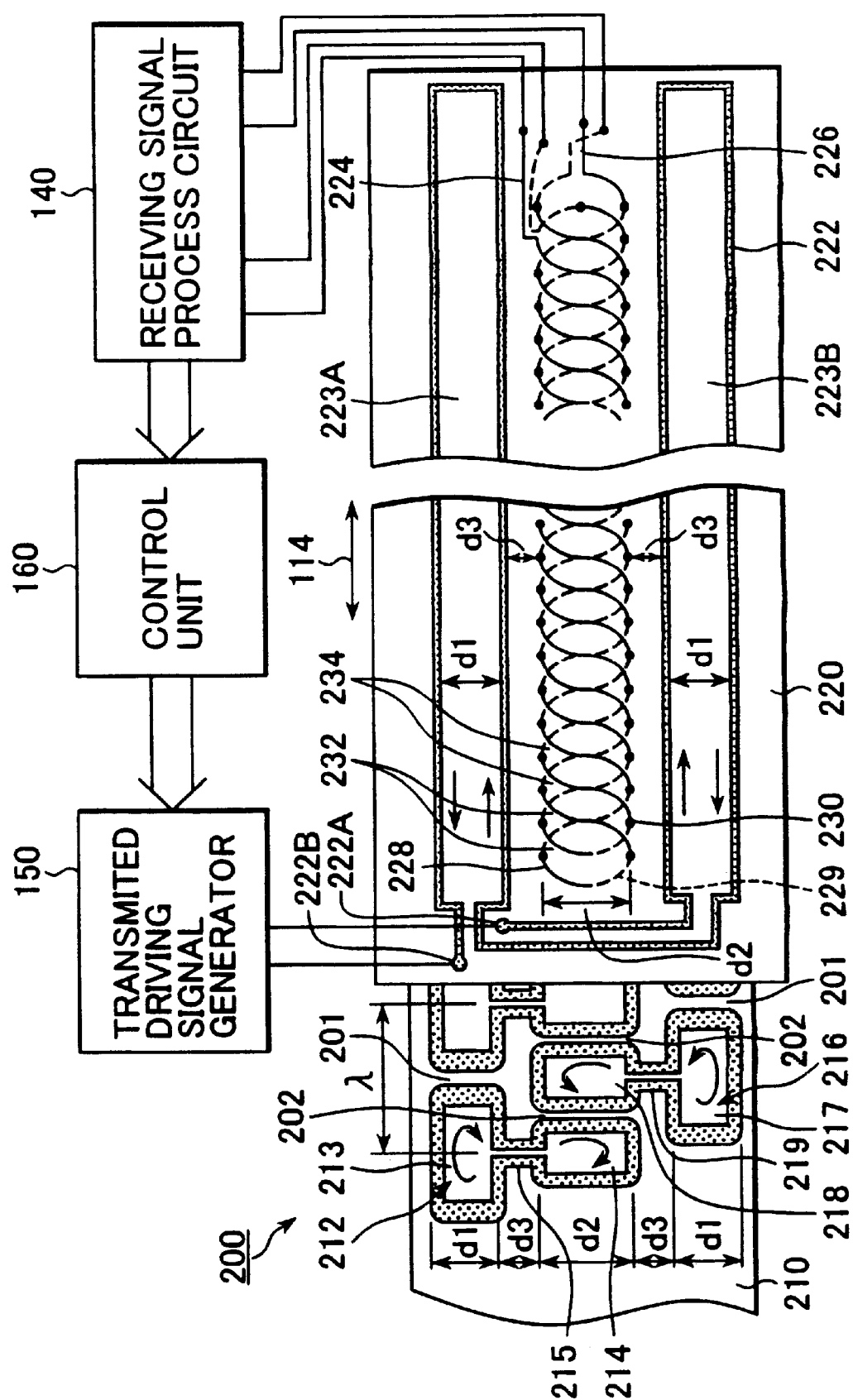

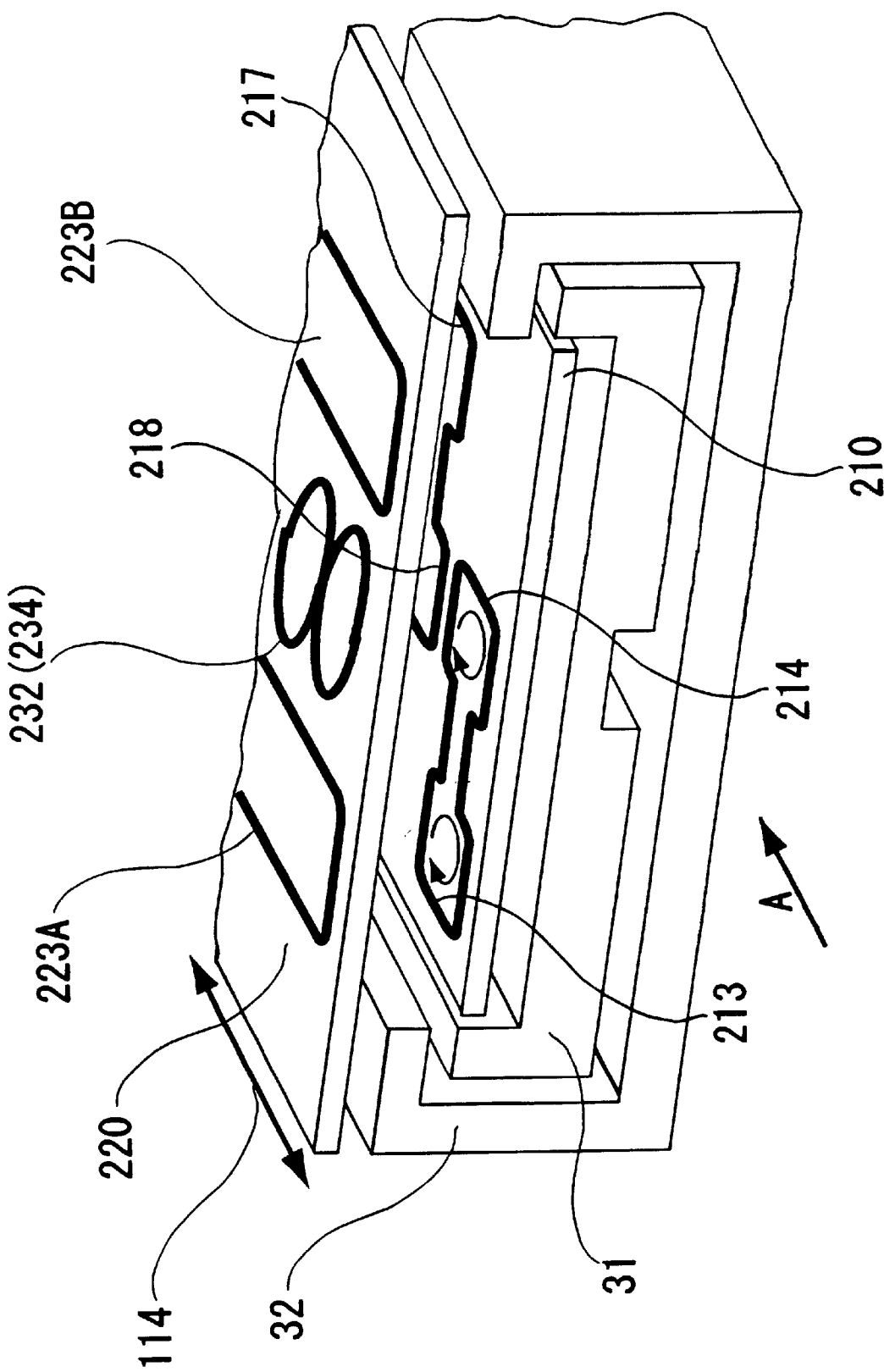

INDUCED CURRENT POSITION SENSOR HAVING A CLOSED MAGNETIC PATH

CROSS REFERENCE TO RELATED APPLICATION

This application claims benefit of priority under 35USC §119 to Japanese Patent Application No. 2000-198895, filed on Jun. 30, 2000, the entire contents of which are incorporated by reference herein.

BACKGROUND OF THE INVENTION

1. Field of the Invention

The present invention relates to an induced current position transducer for use in calipers, linear height gauges and linear scales, for example. More particularly, the present invention relates to an induced current position transducer capable of reducing harmful magnetic fluxes diffusing to the outside from the inside of the transducer to improve signal intensity.

2. Description of the Related Art

Electric calipers using an induced current position transducer have been developed and demonstrated in the art. In the induced current position transducer, a magnetic field generator generates a primary magnetic field, which couples to a first section in a coupling loop that consists of two loop sections. The first section generates an induced current in response to the primary magnetic field. A second section in the coupling loop generates a secondary magnetic field, corresponding to the induced current, which couples to a magnetic flux sensor. The magnetic flux sensor is arranged at a spatial period that corresponds to an array of coupling loops to provide a signal in accordance with a relative position of the coupling loop to the magnetic flux sensor.

The above signal processing technology may be applied to a measurement device. In this case, since the measurement device has restrictions from its characteristic on a structure and a structural material, it often employs a metal for the material. If the above technology is applied to a precise measurement under such the condition, it is required to maintain a magnetic flux intensity having a role of a signal with a possible minimal loss. Nevertheless, the primary and secondary magnetic fields diffuse along the members that construct the measurement device. As a result, an efficient magnetic coupling to the coupling loop can not be ensured and a sufficient signal intensity can not be obtained.

SUMMARY OF THE INVENTION

The present invention has been made in consideration of such the disadvantages and according has an object to provide a higher precise measurement technology by preventing harmful diffusion of magnetic fluxes and reducing a signal intensity variation in accordance with a distance (gap) variation between a coupling loop and a magnetic generator and magnetic flux sensor to improve a stability over the gap variation, and by forming a closed magnetic path between the coupling loop and the magnetic generator and magnetic flux sensor to improve the signal intensity.

The present invention is provided with an induced current position transducer, which comprises a first and a second members arranged opposite to each other and relatively movable along a measurement axis, the first and second members each having a first and a second magnetic flux regions formed normal to the measurement axis; a magnetic field generator for generating a first variable magnetic flux within the first magnetic flux region in response to a driving signal; a coupling loop having a first section located within the first magnetic flux region and a second section located within the second magnetic flux region, the first section generating an induced current in response to the first variable magnetic flux, and the second section generating a second variable magnetic flux corresponding to the induced current; and a magnetic flux sensor disposed within the second magnetic flux region for sensing the second variable magnetic flux, wherein any one of the magnetic field generator, the coupling loop and the magnetic flux sensor is located on one of the first and second members, and the remainder two on the other of the first and second members, and wherein a high permeable substance is disposed on at least a part of the first member, the second member and a gap between the first and second members to form a magnetic path for a flux permeating at least one of the magnetic field generator, the coupling loop and the magnetic flux sensor.

In a preferred embodiment of the present invention, the magnetic field generator and the magnetic flux sensor are located on one of the first and second members, and the coupling loop on the other of the first and second members.

In a second embodiment, the magnetic field generator and the coupling loop may be located on one of the first and second members, and the magnetic flux sensor on the other of the first and second members.

In a third embodiment, the coupling loop and the magnetic flux sensor may be located on one of the first and second members, and the magnetic field generator on the other of the first and second members.

Preferably, the magnetic flux sensor in the first and second embodiments and the magnetic field generator in the third embodiment have a plurality of regions alternating polarities along the measurement axis, which regions are formed in more detail in a periodic pattern with a certain wavelength along the measurement axis.

The high permeable substance may comprise a high permeable resin layered on, a magnetic material adhered on, or a magnetic material embedded in at least one of the first and second members.

The high permeable substance may also comprise a high permeable resin layered on the first member and/or the second member and patterned to cover the pattern of at least one of the magnetic field generator, the coupling loop and the magnetic flux sensor.

One of the first and second members is secured on a beam extending along the measurement axis, and the other of the first and second members is secured on a slider slidably mounted on the beam. The beam and slider may be composed of a magnetic material.

In the present invention, one of the first and second members is secured on a beam extending along the measurement axis, and the other of the first and second members is secured on a slider slidably mounted on the beam. Preferably, the beam is composed of a magnetic material, and in the slider at least one side opposite to the beam is composed of a non-magnetic material.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIG. 1 shows an induced current position transducer according to an embodiment of the present invention;

FIG. 2 is a perspective view showing the same induced current position transducer partly cut off;

DETAILED DESCRIPTION OF THE PREFERRED EMBODIMENTS

Figure 3A:
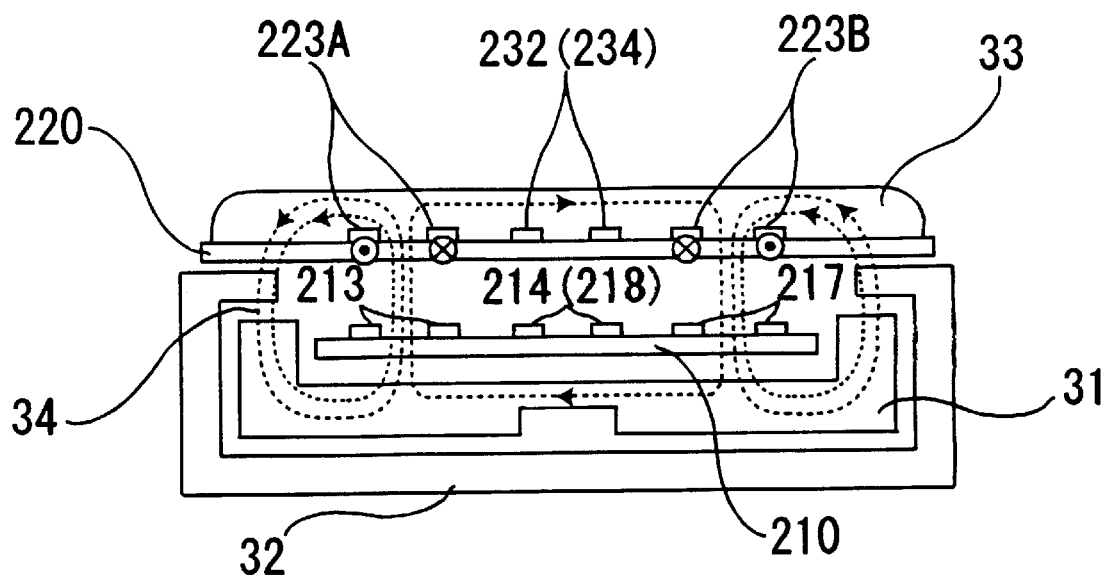
FIG. 3A is a cross-sectional view of FIG. 2 seen in the direction of the arrow A.

Preferred embodiments of the present invention will be described below with reference to the accompanying drawings.

FIG. 1 shows the main part of an incremental, induced current position transducer according to an embodiment of the present invention.

The position transducer 200 comprises a read head 220 or a first member and a scale 210 or a second member, which are arranged opposite to each other via a certain gap interposed therebetween and relatively movable along a measurement axis 114 in the figure. In this embodiment, a magnetic field generator 222, each two sets of magnetic flux sensors 224, 226 and coupling loops 212, 216 are provided to reduce an offset while each one set of the sensors and the loops may also be applied in the present invention. The magnetic field generator 222 and magnetic flux sensors 224, 226 are located on the read head 220 and the coupling loops 212, 216 on the scale 10. The magnetic field generator 222 and first sections 213, 217 in the coupling loops 212, 216 are located within a first magnetic flux region while the magnetic flux sensors 224, 226 and second sections 214, 218 in the coupling loops 212, 216 are located within a second magnetic flux region.

The scale 210 includes a plurality of first coupling loops 212 consisting of closed loops with a first polarity and a plurality of second coupling loops 216 consisting of closed loops with a second polarity. The coupling loops 212 are spatially phase-shifted and electrically isolated from the coupling loops 216.

A first coupling loop 212 includes a first section 213 and a second section 214 connected to each other through a pair of connection conductors 215. A second coupling loop 216 includes a first section 217 and a second section 218 connected to each other through a pair of connection conductors 219 in the same manner.

In the plurality of first coupling loops 212, the first sections 213 are arrayed on a first side edge of the scale 210 along the measurement axis 114. The second sections 214 are arrayed on the center of the scale 210 along the measurement axis 114. The connection conductors 215 extend in the direction normal to the measurement axis 114 to connect the first sections 213 with the second sections 214.

In the plurality of second coupling loops 216, the first sections 217 are arrayed on a second side edge of the scale 210 along the measurement axis 114. The second sections 218 are arrayed on the center of the scale 210 along the measurement axis 114 and interleaved with the second sections 214 of the coupling loops 212. The connection conductors 219 extend in the direction normal to the measurement axis 114 to connect the first sections 217 with the second sections 218.

The read head 220 in the induced current position transducer 200 includes a magnetic field generator 222 that has a first part 223A and a second part 223B of the magnetic field generator. The first part 223A of the magnetic field generator is located at the first side edge of the read head 220 while the second part 223B of the magnetic field generator is located at the second side edge of the read head 220. The first 223A and second 223B parts of the magnetic field generator comprise rectangular patterns with a long side that extends along and has the same length as the measurement axis 114. In addition, the first 223A and second 223B parts of the magnetic field generator have a short side that extends in the direction normal to the measurement axis 114 and has a length of d1.

The magnetic field generator 222 has terminals 222A and 222B that are connected to a driving signal generator 150 for transmission. The driving signal generator 150 supplies a time-variable driving signal to the magnetic field generator terminal 222A. As a result, a time-variable current can flow from the terminal 222A to the terminal 222B through the magnetic field generator 222.

In response to the above operation, the first part 223A of the magnetic field generator generates a primary magnetic field that rises up from the sheet of FIG. 1 inside the loop of the first part 223A and falls down to the sheet of FIG. 1 outside the loop of the first part 223A. To the contrary, the second part 223B of the magnetic field generator generates a primary magnetic field that rises up from the sheet of FIG. 1 outside the loop of the second part 223B and falls down to the sheet of FIG. 1 inside the loop of the second part 223B. As a result, such currents are induced in the coupling loops 212 and 216 that can cancel magnetic field variations.

The induced currents flowing into the first sections 213, 217 in the coupling loops respectively have the opposite direction to those that flow into the corresponding proximal portions in the parts 223A, 223B of the magnetic field generator. Loop currents with the opposite polarities flow into adjacent ones of the second sections 214 and 218 that are located on the scale center. Thus, a secondary magnetic field is generated so that magnetic field components with the opposite polarities distribute periodically along the center of the scale. The periodic secondary magnetic field has a wavelength of $\lambda$ that is equal to an interval between successive two of the second sections 214 (or 218).

For the purpose of maintaining the magnetic flux intensity of the primary and secondary magnetic fields and reducing leakage fluxes to external, a high permeable substance is disposed for the scale 210 and the read head 220. Positions to locate the substance and effects caused from the location of the substance will be described later in detail.

The read head 220 includes a first 224 and a second 226 magnetic flux sensors. These first 224 and second 226 magnetic flux sensors respectively consist of conductor segments 228 and 229 that form part of a plurality of sinusoidal waveforms. The conductor segments 228 and 229 are patterned on both surfaces of an insulating layer in a printed circuit board that is employed to configure the read head 220.

The segments 228 and 229 are connected via through wires 230 to form positive polar loops 232 and negative polar loops 234 alternating in the first 224 and second 226 magnetic flux sensors. As a result, inductive regions are arrayed and formed in a spatially width-modulated periodic pattern. In this case, a pair of adjacent positive polar loop 232 and negative polar loop 234 has a length along the measurement axis equal to a wavelength of λ. In addition, a phase difference of λ/4 is defined between the first magnetic flux sensor 224 and the second magnetic flux sensor 226. The first 224 and second 226 magnetic flux sensors are arranged on the center of the read head 220 and sandwiched between the first 223A and second 223B parts of the magnetic field generator, having a width of d2 along the direction normal to the measurement axis.

Useless coupling from the magnetic field generator loops to the magnetic flux sensor loops (independent of the position and the scale) can be avoided with such the configuration. The primary magnetic fields generated from the first 223A and second 223B parts of the magnetic field generator direct to opposite directions in the proximity of the first 224 and second 226 magnetic flux sensors. Therefore, the primary magnetic fields cancel one another within occupied areas of the first 224 and second 226 magnetic flux sensors. Ideally, the primary magnetic fields should be cancelled completely in the areas.

The first 224 and second 226 magnetic flux sensors are inwardly spaced apart a gap of d3 equally from the first 223A and second 223B parts of the magnetic field generator. Therefore, according to the first 223A and second 223B parts of the magnetic field generator, the magnetic fields generated in the areas occupied by the first 224 and second 226 magnetic flux sensors in the read head 220 are symmetrical and opposite. Direct inductive actions can be thereby cancelled effectively. Voltages induced across the first 224 and second 226 magnetic flux sensors from useless direct coupling with the first 223A and second 223B parts of the magnetic field generator can be reduced first to some extent if the magnetic field generator is spaced from the magnetic flux sensors. Second, a symmetrical design can reduce the useless coupling to zero.

The plural first coupling loops 212 are arrayed at the same pitch as the wavelength λ of the first 224 and second 226 magnetic flux sensors. The first sections 213 are intended to have a length as close to the wavelength λ as possible along the measurement axis 114 while ensuring an insulating space 201 between adjacent ones. The first sections 213 provide a width of d1 in the direction normal to the measurement axis 114.

The plural second coupling loops 216 are similarly arrayed at the same pitch as the wavelength λ. The first sections 217 are intended to have a length as close to the wavelength λ as possible along the measurement axis 114 while ensuring an insulating space 201 between adjacent ones. They provide a width of d1 in the direction normal to the measurement axis 114.

The second sections 214 and 218 in the first 212 and second 216 coupling loops are also arrayed at the same pitch as the wavelength λ. The second sections 214 and 218, however, have a length along the measurement axis 114 that is determined as close to ½ the wavelength λ as possible. An insulating space 202 is provided between a pair of adjacent second sections 214 and 218 as shown in the figure. Thus, the second sections 214 and 218 in the first 212 and second 216 coupling loops are interleaved along the length of the scale 210. The second sections 214 and 218 have a width of d2 in the direction normal to the measurement axis 114.

A gap of d3 is provided between the second sections 214 and 218 and the corresponding first sections 213 and 217. Therefore, when the read head 220 is located close to the scale 210, the first part 223A of the magnetic field generator is arranged in line with the first section 213 of the first coupling loop 212. The first part 223B of the magnetic field generator is arranged in line with the second section 217 of the second coupling loop 217. The first 224 and second 226 magnetic flux sensors are arranged in line with the second sections 214 and 218 in the first 212 and second 216 coupling loops.

In this embodiment, the scale 210 and the read head 220 employ printed circuit boards. In addition, the magnetic field generator, coupling loops and magnetic flux sensors are produced with printed circuit board processes.

In measurement operations, a time-variable driving signal is supplied from the driving signal generator 150 to the terminal 222A of the magnetic field generator. The first part 223A of the magnetic field generator thereby generates a first variable magnetic field in a first direction. The second part 223B generates a second variable magnetic field in a second direction opposite to the first direction. The second variable magnetic field has the same magnetic field intensity as the first variable magnetic field generated from the first part 223A of the magnetic field generator.

The plural first coupling loops 212 couple inductively with the first part 223A of the magnetic field generator by means of the first magnetic field generated from the first part 223A. An induced current thereby flows clockwise into each of the first coupling loops 212. At the same time, the plural second coupling loops 216 couple inductively with the second part 223B of the magnetic field generator by means of the second magnetic field generated from the second part 223B. This induces a current flowing counterclockwise into each of the second coupling loops 216. As a result, these currents flow in the opposite directions through the second sections 214 and 218 in the coupling loops 212 and 216.

The clockwise current flowing into the second section 214 in the first coupling loop 212 generates a third magnetic field that falls down to the sheet of FIG. 1 within the second section 214. The counterclockwise current flowing into the second section 218 in the second coupling loop 216 generates a fourth magnetic field that rises up from the sheet of FIG. 1 within the second section 218. A net variable magnetic field is thereby created along the measurement axis 114. This variable magnetic field has a wavelength equal to the wavelength λ of the first 224 and second 226 magnetic flux sensors.

Accordingly, when the positive polar loops 232 of the first magnetic flux sensor 224 meet one of the second sections 214, 218, the negative polar loops 234 of the first magnetic flux sensor 224 meet the other of the second sections 214, 218. This situation is similarly caused when the positive polar loops 232 and negative polar loops 234 of the second magnetic flux sensor 226 meet the second sections 214, 218. The variable magnetic fields generated from the second sections 214 and 218 are spatially modulated with the same wavelength as that used for spatially modulating the first 214 and second 216 sections of the magnetic flux sensors.

Therefore, induced electromotive forces (EMF) generated when the positive 232 and negative 234 polar loops meet the second section 214 are equal to each other and opposite to EMFs generated when they meet the second section 218.

Thus, the net output from the positive polar loop 232 exhibits a sinusoidal function of a position "x" of the read head 220 along the scale 210 when the read head 220 moves relative to the scale 210. In this function, an offset component in the output signal caused from the useless coupling becomes nominal zero. Similarly, the net output from the negative polar loop 234 exhibits a sinusoidal function of the position "x" of the read head 220 along the scale 210 when the read head 220 moves relative to the scale 210. In this function, an offset component in the output signal caused from the useless coupling becomes nominal zero. EMF contributions are provided in the same phase from the positive polar loop 232 and the negative polar loop 234.

The first 224 and second 226 magnetic flux sensors are in a quadrature relation. Therefore, the output signal obtained at the first magnetic flux sensor 224 as the function of the position x has a phase difference of 90° from the output signal obtained at the second magnetic flux sensor 226 as the function of the position x. These signals are both sent to a signal process circuit 140 for processing received signals.

From the first 224 and second 226 magnetic flux sensors, the signal process circuit 140 reads in the output signals, which are sampled, converted into digital values and then sent to a control unit 160. The control unit 160 processes the digitized output signals to determine the relative position x of the read head 220 to the scale 210 within the wavelength λ.

It should be appreciated that an appropriate variation on the locations of the through wires can give a zero width in the direction normal to the measurement axis to one of the positive polar loops 232 and negative polar loops 234 (effecting as simple conductor elements between adjacent loops). In this case, the first 224 and second 226 magnetic flux sensors serve as single-polar magnetic flux receivers, which have increased sensitivities to an external magnetic field and provide output signals with ½ amplitude (resulted from reduction of the loop region) compared to the previous embodiment.

This design modification can provide some benefits. As a result of the magnetic field generator symmetrically configured, the useless magnetic fluxes through loops are held at nominal zero. The output signals from the magnetic flux sensors 224 and 226 also have zero offset and swing between a positive maximum value and a negative minimum value. A degree of output signal variation per unit displacement is extremely high with respect to a given measurement range because of complementary periodic structures of the scale element and magnetic flux sensors.

On the basis of properties of quadrature outputs from the first 224 and second 226 magnetic flux sensors, the control unit 160 can determine the direction of relative movement of the read head 220 to the scale 210. The control unit 160 counts part or all of "increments" of the wavelength λ passing through. The control unit 160 employs the count and the relative position within the wavelength λ to provide a relative position from a certain origin located between the read head 220 and the scale 210. The control unit 160 sends a control signal to the driving signal generator 150, which generates the time-variable driving signal.

FIG. 2 shows an outlined positional relation between the scale 210 and the read head 220 in the embodiment. For the convenience of simplification, the transducer is sliced with a plane normal to the measurement axis 114.

A beam 31, extending along the measurement axis, supports a slider 32 slidably. The scale 210 is located on the beam 31 and the read head 220 is located on the slider 32, opposing to the scale 210.

Figure 3B:
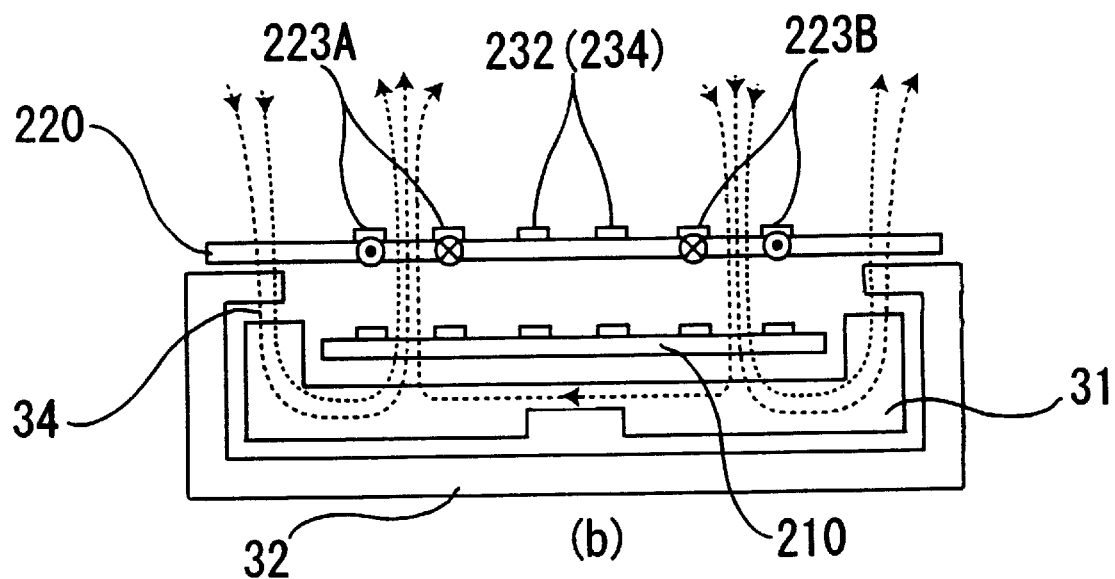
FIG. 3B is a cross-sectional view of a conventional device shown for the purpose of comparison.

FIG. 3A shows a cross section of the scale 210 and the read head 220 together with elements for supporting them seen in the A-direction of FIG. 2. FIG. 3B shows a conventional example for the purpose of comparison.

The beam 31 and slider 32 are composed of magnetic stainless steel, for example. A substance with a high permeability is layered on the read head 220 in a surface opposite to the scale 210. This high permeable substance 33 may employ a high permeable resin composed of high permeable magnetic powders mixed in a resin. In this case, if an IC is mounted on a surface of the read head 220 and the high permeable resin is to be layered on the surface, the high permeable substance 33 can be formed by pouring the resin. If no IC is mounted, a usual magnetic plate or tape may be adhered on that surface of the read head 220.

The high permeable substance 33 can be arranged on the upper surface of the read head 220. This arrangement allows, as shown in FIG. 3A, the most of magnetic fluxes 34 that are generated from and located in the figure above the magnetic field generator parts 223A and 223B to pass through the high permeable substance 33 that has a low magnetic resistance. Therefore, it is possible to suppress leakage and dispersion of the magnetic fluxes 34 to external and concentrate the magnetic fluxes generated from the magnetic field generator parts 223A and 223B onto the first sections 213, 217 in the coupling loops 212, 216. It is also possible to reduce magnetic resistances in magnetic circuits and increase intensities of signals received at the magnetic flux sensors 232, 234.

To the contrary, in the conventional induced current position transducer shown in FIG. 3B, no magnetic material is connected to a surface of the read head 220. In addition, an inner frame of the slider 32 is composed of a magnetic metal. Accordingly, flows of the magnetic fluxes 34 can not form a closed magnetic circuit that passes through the surface of the read head 220 effectively, resulting in diffusion of the magnetic fluxes 34 toward above the read head 220. As a result, the magnetic fluxes from the magnetic field generator parts 223A, 223B can not concentrate on the first sections 213, 217 in the coupling loops 212, 216, causing leakage fluxes that yield losses. This means that the third and fourth magnetic fields generated from the second sections 214, 218 in the coupling loops 212, 216 are also weaken. Further, the third and fourth magnetic fields diffuse toward above the read head 220 to prevent them from concentrating efficiently on the magnetic flux sensors 232, 234. Accordingly, the magnetic flux sensors 232, 234 can not provide sufficient signal intensities.

Figure 4:
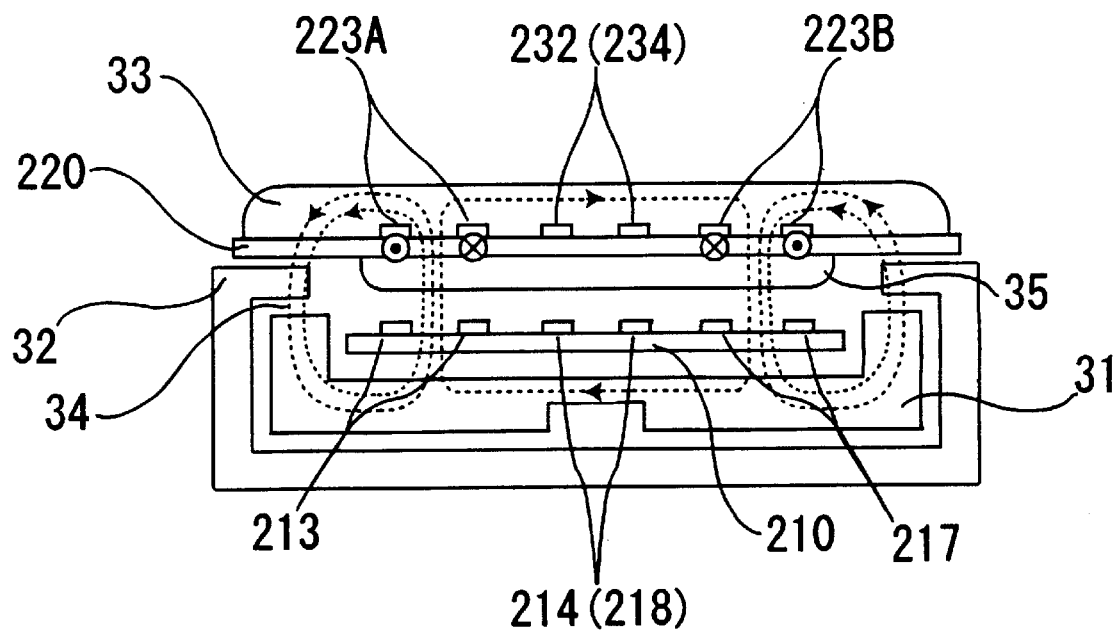
FIG. 4 is a cross-sectional view of a transducer according to another embodiment of the present invention.

It is more effective if a high permeable substance exists between the read head 220 and the scale 210. FIG. 4 shows another high permeable substance 35 that is layered on the read head 220 in a surface opposing to the scale 210. The high permeable substance 35 may also be layered on the scale 210 in a surface opposing to the read head 220.

Figure 5:
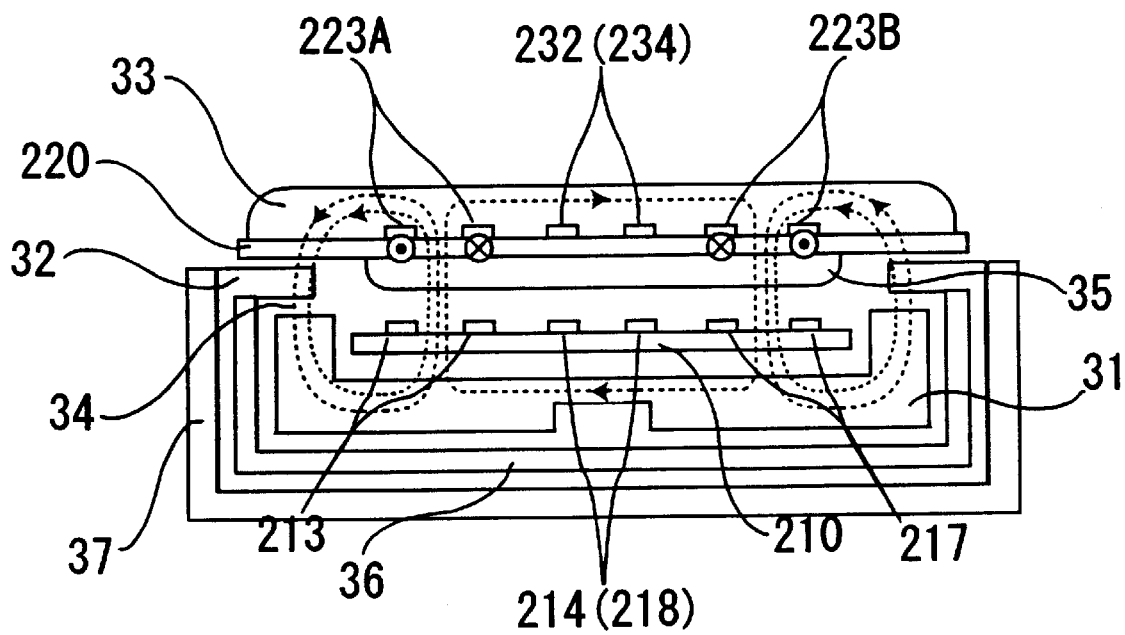
FIG. 5 is a cross-sectional view of a transducer according to a further embodiment of the present invention.

FIG. 5 shows another example of the slider 32, which has an inner frame 36 that may be composed of a non-magnetic metal or resin and an outer frame 37 that may be composed of a magnetic stainless steel. According to such the arrangement, the inner frame 36 can prevent magnetic fluxes from diffusing from the beam 31 to the slider 32. In addition, the outer frame 37 of the slider 32 can magnetically shield external magnetic fields that affect on measurements.

Figure 6:
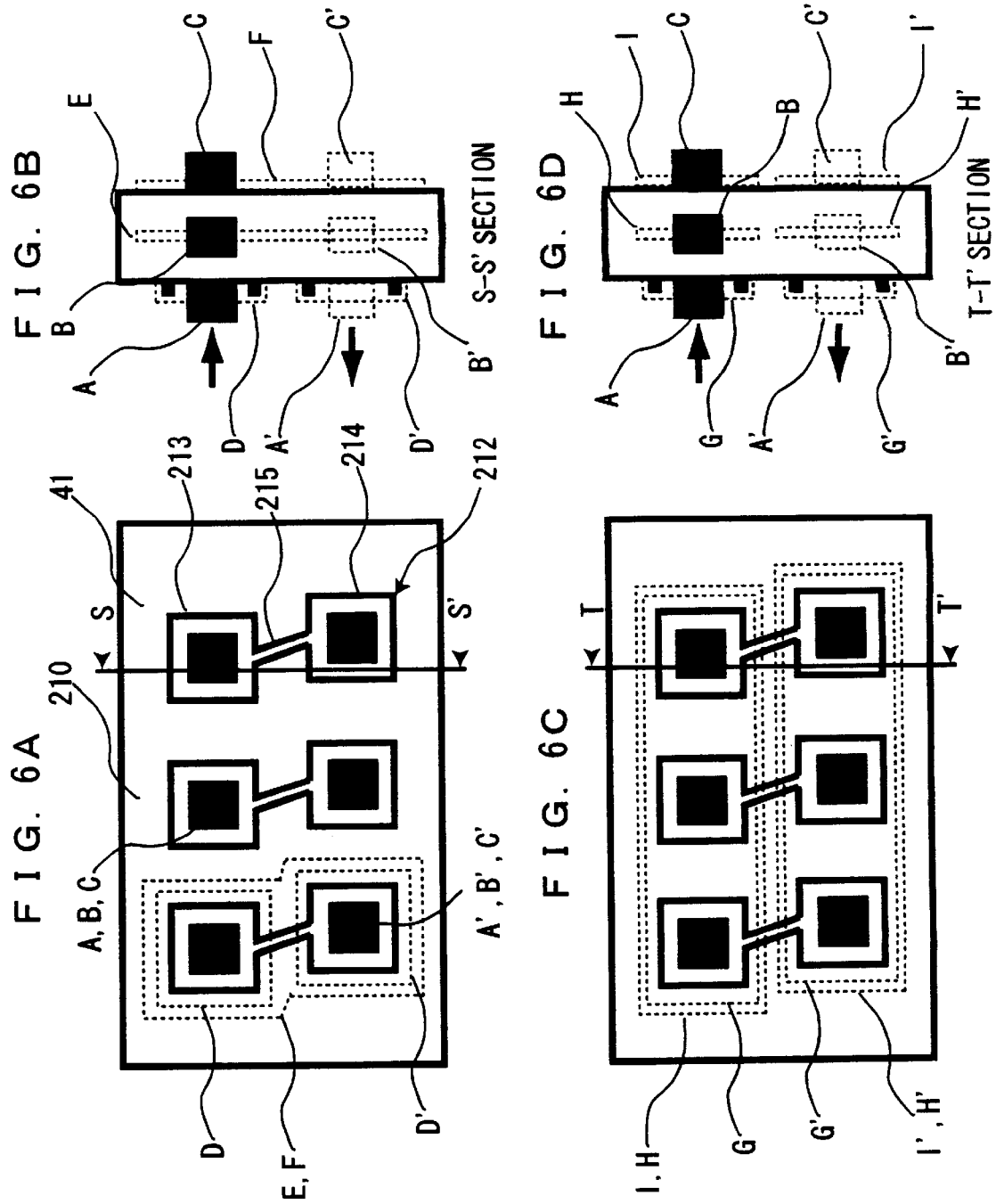
FIGS. 6A–B are a cross-sectional view and a plan view of a scale in a transducer according to a further embodiment of the present invention.
FIGS. 6C–D are a cross-sectional view and a plan view of a scale in a transducer according to a further embodiment of the present invention.

FIGS. 6A–D show 16-way positions A–I and A'–I' to arrange high permeable substances on the scale 210. FIGS. 6B and 6D are cross-sectional views of FIGS. 6A and 6C respectively taken along arrowhead lines S—S' and T—T'.

Figure 7:
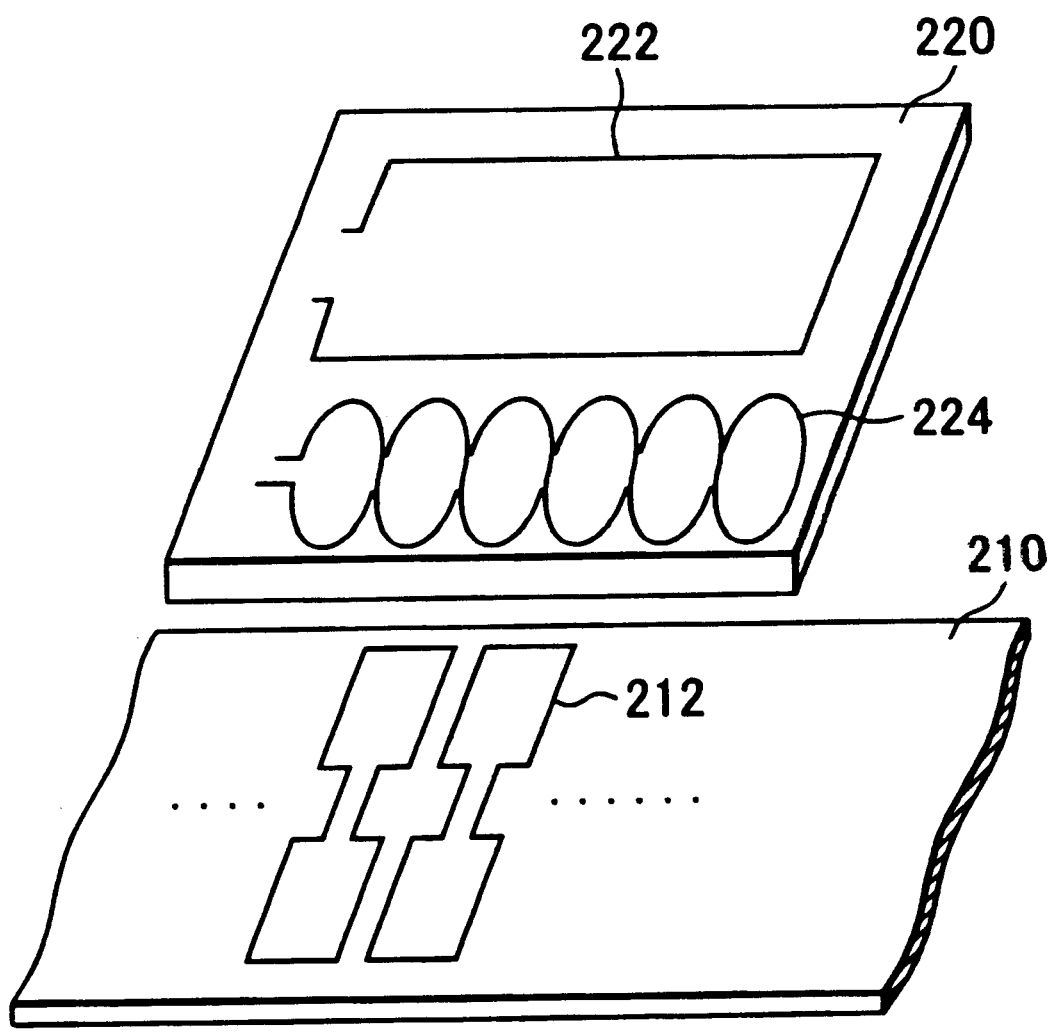
FIG. 7 is a perspective view showing the main part of the same transducer.

The scale 210 is applied to such an induced current position transducer as shown in FIG. 7. The transducer comprises a set of magnetic field generator 222 and a set of magnetic flux sensor 224 on the first member or read head 220 and a plurality of coupling loops 212 on the second member or scale 210. The arrangement of the high permeable substance shown in FIG. 6 may also be applied to the induced current position transducer shown in FIG. 1.

Desirably, as shown with arrows in the figure, the position for arranging the high permeable substance is determined on a path that can be considered ideal for a signal magnetic flux to pass therethrough.

For the above reason, a high permeable substance characteristically exists corresponding to each coupling loop 212 located inside a scale substrate 41 or on the upper or lower surface thereof. In particular, A, B, C and A', B', C' are respectively located on extensions of axes of the first sections 213 and the second sections 214.

E and F exemplify pattern formations of a high permeable substance per coupling loop 212. I, H and I', H' exemplify pattern formations of the same first sections 213 and of the same second sections 214 in each coupling loop 212 using common high permeable substances. Any one of the above 16-way positions A–I and A'–I' may also be applied to arrange high permeable substances. Any combination of the positions to arrange high permeable substances may be selected in accordance with restrictions such as a design specification for the transducer.

The more the positions for arranging high permeable substances exist, the more the effect by the positions becomes sufficient to increase the signal intensity and reduce the leakage flux.

Figure 8:
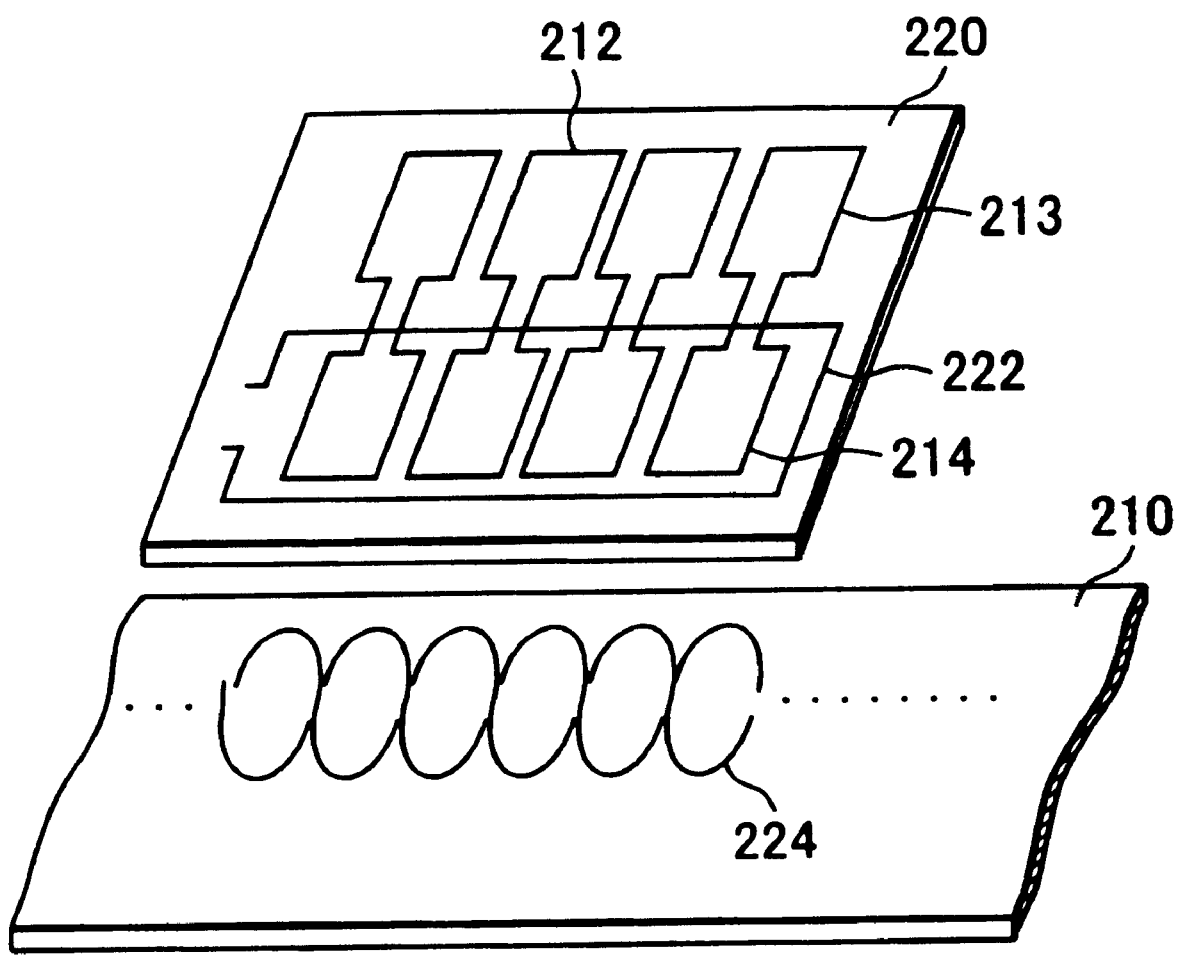
FIG. 8 is a perspective view showing the main part of a transducer according to a further embodiment of the present invention.

In the above embodiment, the magnetic field generator 222 and magnetic flux sensor 224 are located on the read head 220 while the coupling loops 212 on the scale 210. The magnetic flux sensor 224 may be formed on the scale 210 while the coupling loops 212 and magnetic field generator 222 on the read head 220 as shown in FIG. 8. In this case, the magnetic flux sensor 224 has a waveform pattern crossing at a certain period and the magnetic field generator 222 has a rectangular pattern formed to cover the second sections 214 in the coupling loops 212.

Figure 9:
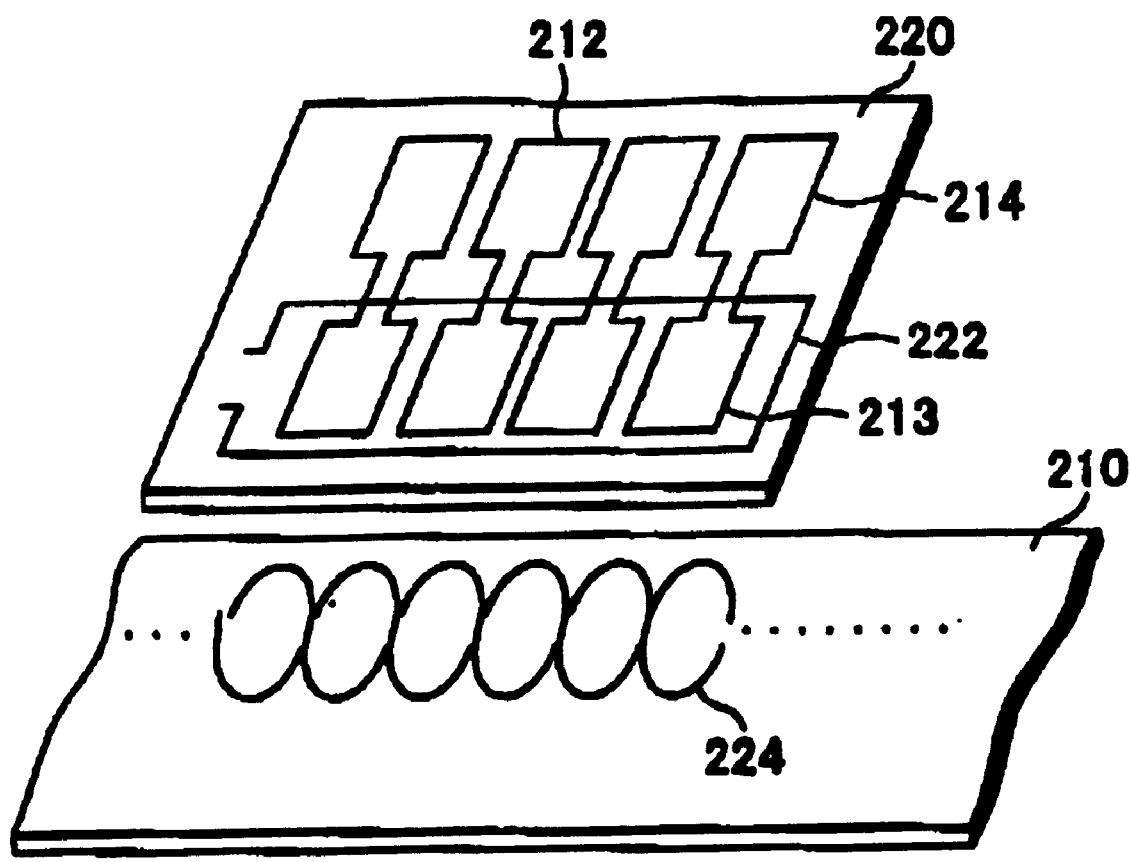
FIG. 9 is a perspective view showing the main part of a transducer according to a further embodiment of the present invention.

FIG. 9 shows a further embodiment. In this embodiment, the magnetic flux sensor 224 is formed on the scale 210 while the coupling loops 212 and magnetic field generator 222 on the read head 220. In this case, the magnetic flux sensor 224 has a waveform pattern crossing at a certain period and the magnetic field generator 222 has a rectangular pattern formed to cover the first sections 213 in the coupling loops 212. The present invention is also applicable to the induced current position transducer thus configured.

As obvious from the forgoing, according to the present invention, an efficient closed magnetic path is formed between a magnetic field generator and a magnetic flux sensor to reduce occurrence of a harmful leakage magnetic flux and prevent affection from an external magnetic field. This leads to an induced current position transducer capable of improving signal intensity and achieving a higher precise measurement.

Having described the embodiments consistent with the present invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. An induced current position transducer, comprising:
    a first and a second members arranged opposite to each other and relatively movable along a measurement axis, said first and second members each having a first and a second magnetic flux regions formed normal to said measurement axis;
    a magnetic field generator for generating a first variable magnetic flux within said first magnetic flux region in response to a driving signal;
    a coupling loop having a first section located within said first magnetic flux region and a second section located within said second magnetic flux region, said first section generating an induced current in response to said first variable magnetic flux, and said second section generating a second variable magnetic flux corresponding to said induced current; and
    a magnetic flux sensor disposed within said second magnetic flux region for sensing said second variable magnetic flux, wherein any one of said magnetic field generator, said coupling loop and said magnetic flux sensor is located on one of said first and second members, and the remainder two on the other of said first and second members, and wherein a high permeable substance is formed and then patterned on at least a part of said first member, said second member and a gap between said first and second members to cover the pattern of at least one of said magnetic field generator, said coupling loop and said magnetic flux sensor, thus the high permeable substance forming a magnetic path for a flux permeating at least one of said magnetic field generator, said coupling loop and said magnetic flux sensor.

2. The induced current position transducer according to claim 1, wherein said high permeable substance comprises a high permeable resin layered on at least one of said first and second members.

3. The induced current position transducer according to claim 1, wherein said high permeable substance comprises a magnetic material adhered on at least one of said first and second members.

4. The induced current position transducer according to claim 1, wherein said high permeable substance comprises a magnetic material embedded in at least one of said first and second members.

5. The induced current position transducer according to claim 1, wherein said high permeable substance comprises a high permeable resin layered on said first member and/or said second member and patterned to cover the pattern of at least one of said magnetic field generator, said coupling loop and said magnetic flux sensor.

6. The induced current position transducer according to claim 1, wherein one of said first and second members is secured on a beam extending along said measurement axis, and the other of said first and second members is secured on a slider slidably mounted on said beam, said beam and slider composed of a magnetic material.

7. The induced current position transducer according to claim 1, wherein one of said first and second members is secured on a beam extending along said measurement axis, and the other of said first and second members is secured on a slider slidably mounted on said beam, said beam composed of a magnetic material, and in said slider at least one side opposite to said beam composed of a non-magnetic material.

* * * * *